United States Patent [19]

Neumeyer

[11] Patent Number: 4,779,765
[45] Date of Patent: Oct. 25, 1988

[54] FERTILIZER DIVIDER FOR DUAL AIR SYSTEM

[75] Inventor: Lowell H. Neumeyer, Des Moines, Iowa

[73] Assignee: Deere & Company, Moline, Ill.

[21] Appl. No.: 37,743

[22] Filed: Apr. 13, 1987

[51] Int. Cl.⁴ .............................................. B65G 11/00
[52] U.S. Cl. .................................... 222/142; 222/290; 222/297; 222/630; 111/73; 406/120; 406/123
[58] Field of Search ............... 222/134, 135, 138, 142, 222/295, 282, 290, 305, 298, 300, 630, 297; 111/77, 73, 80, 34; 406/123, 122, 119, 120

[56] References Cited

U.S. PATENT DOCUMENTS 4,379,664 4/1983 Klein et al. ...................... 111/80 X
4,603,645 8/1986 Weimeyer .......................... 111/73 X
4,686,914 8/1987 Schaaf et al. ........................ 111/73

Primary Examiner—Joseph J. Rolla
Assistant Examiner—Nils E. Pedersen

[57] ABSTRACT

A dual air system for separately conveying fertilizer and seed in an implement such as an air drill or air seeder which includes an adjustable divider arrangement for providing a small amount of starter fertilizer to be placed with the seed. The total fertilizer metered by a fluted feed wheel is divided into two streams by an adjustable knife plate. A pivoting baffle plate resting against the knife plate deflects one of the two fertilizer portions to the fertilizer air system. The other fertilizer stream is delivered to the seed air system. The overall rate of fertilizer application may be adjusted without affecting the total amount of fertilizer provided to the seed air system.

12 Claims, 2 Drawing Sheets

FERTILIZER DIVIDER FOR DUAL AIR SYSTEM

BACKROUND OF THE INVENTION

The present invention relates generally to agricultural seeding implements, and more specifically, to a dual air system for separately applying two granular materials such as seed and fertilizer.

Air seeders and drills having an air system for delivering seed and fertilizer to a furrow opening device are widely used. In a typical structure such as exemplified by the John Deere Models 655 and 665 Air Seeders, seed and fertilizer from two separate hoppers are metered into a common venturi by fluted wheels and are conveyed together through a conduit to seed boot assemblies behind earthworking tools on the implement. Such a system has the disadvantage of applying seed directly adjacent the fertilizer and subjecting the seed and seedlings to possible damage by the fertilizer. The fertilizer application rate must therefore be limited. To overcome this problem, systems have been developed which utilize separate metering and distribution systems for the seed and the fertilizer, and which include a banding type of arrangement on the tillage tool to separate the fertilizer from the seed. However, it has been found advantageous to apply a small amount of fertilizer directly with the seed to aid the growth and development of the seedling. This so called starter fertilizer must be carefully metered with the seed for uniform distribution in the furrow.

BRIEF SUMMARY OF THE INVENTION

It is therefore an object of the present invention to provide structure for metering two different granular materials into two separate delivery lines while at the same time providing a preselected amount of one of the materials into the delivery line associated with the other material. It is a further object to provide such a structure wherein the preselected amount does not vary as the overall rate of that material is adjusted.

It is a further object of the present invention to provide an improved metering system for an air drill or seeder or the like wherein seed and fertilizer are metered into two separate conduits and wherein a preselected amount of fertilizer may be added to the conduit normally containing only the seed. It is a further object to provide such a structure which is relatively simple in construction and yet which can accurately provide a preselected amount of fertilizer in the seed conduit. It is a further object to provide such a structure wherein the preselected amount remains virtually unchanged as the application rate of the fertilizer is adjusted.

A device constructed in accordance with the present invention includes a transversely extending housing supporting a first area for receiving fertilizer and a second area for receiving grain from respective rotary delivery devices such as metering rolls. A seed baffle plate directs seed from the seed roll toward one side of the housing for delivery into the seed receiving area. An airstream carries the seed to a seed distribution system on the implement. A fertilizer baffle plate, separated from the seed baffle plate, directs fertilizer toward the opposite side of the housing for delivery into the fertilizer receiving area where a separate airstream moves the fertilizer to a second distribution system on the implement. The fertilizer baffle plate is pivotally connected to the housing and rests against an upright movable knife plate located closely adjacent the fertilizer metering roll for dividing the metered fertilizer into a first main stream on one side of the plate which is delivered to the fertilizer receiving area and a smaller second stream on the opposite side of the plate. The second stream is directed into the seed receiving area so that the fertilizer is mixed with the seed as it is conveyed in the distribution system. The knife plate may be adjusted transversely with respect to the fertilizer feed roll to adjust the amount of fertilizer mixed with the seed. The fluted fertilizer metering roll can be adjusted transversely to adjust the overall rate of fertilizer distribution without affecting the amount of fertilizer mixed with the seed. Therefore, starting fertilizer may be accurately mixed with the seed, and amount mixed does not vay with changes in the overall rate of application of the fertilizer. The system maintains the advantages of separate seed and fertilizer placement while permitting a preselected amount of starter fertilizer to be mixed with the seed for optimum initial growth of the crop. The preselected amount of starter fertilizer is easily and accurately adjusted by moving the knife plate relative to the fertilizer metering roll. Since the knife plate is located closely adjacent the metering roll, unwanted variations in the amount of starter fertilizer caused by gravitational effects and changes in feed roll speed are minimized. The device is relatively simple and economical to construct, is compact, and has no moving parts, once adjusted.

These and other objects, features and advantages of the present invention will become apparent to those skilled in the art from the description which follows and from the drawings.

DESCRIPTION OF THE PREFERRED EMBODIMENT

Figure 1:
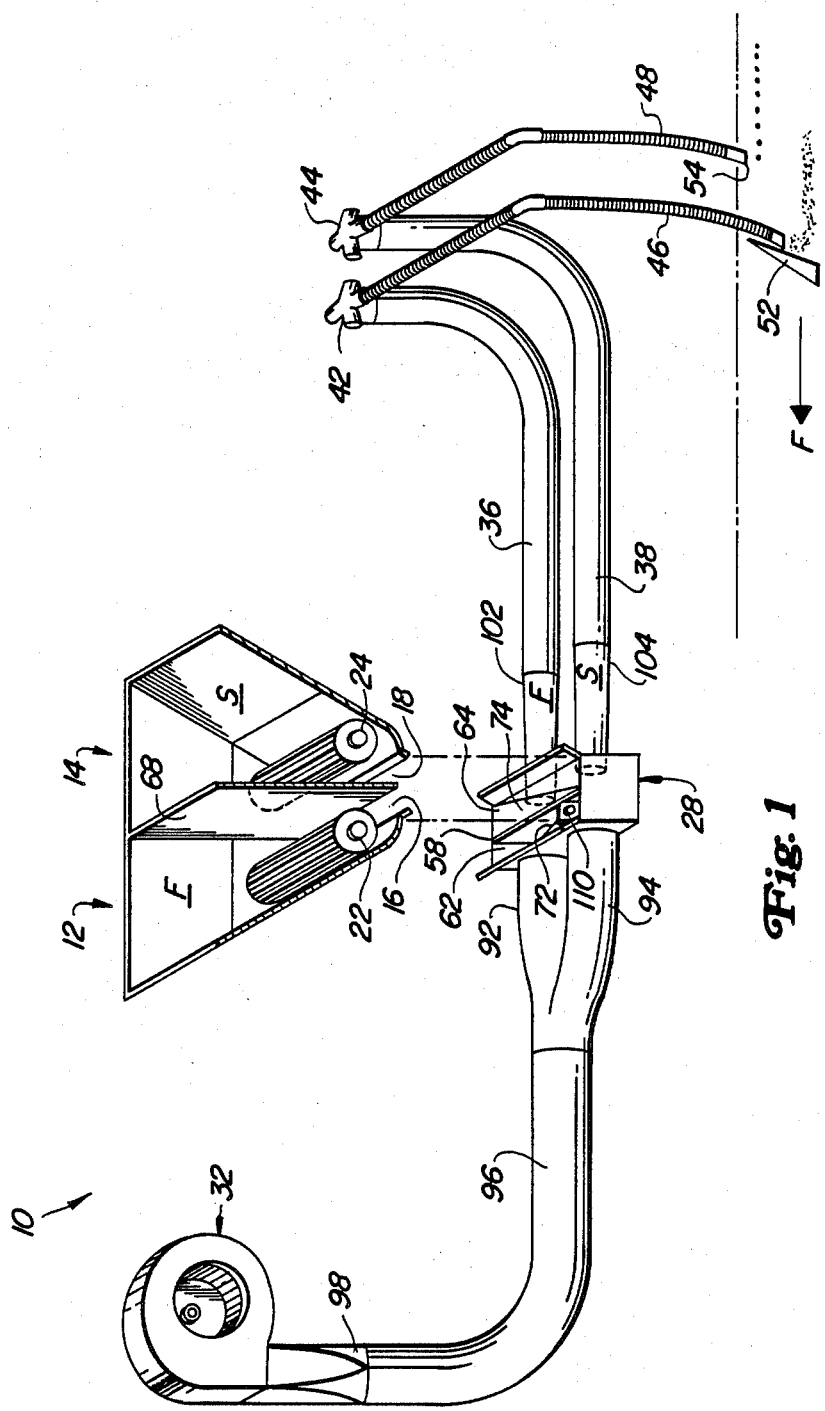
FIG. 1 is a schematic representation of a metering system utilized on an air seeder or similar implement.
Figure 2:
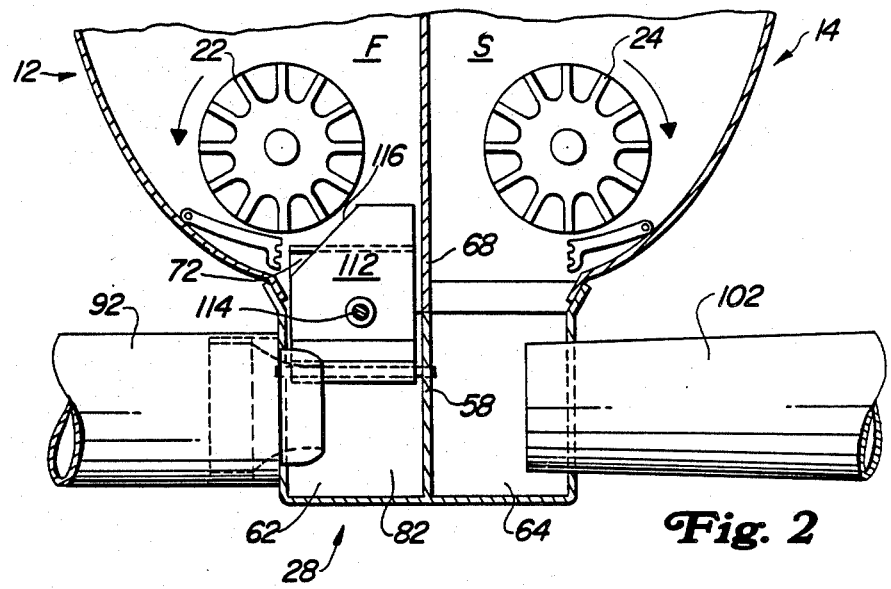
FIG. 2 is an enlarged side view, partially in section, showing the metering and housing structure of the present invention.

Referring to FIG. 1, there is shown an overall schematic of a separate seed and fertilizer placement system indicated generally at 10 mounted on an air seeder or air drill frame (not shown) for forward movement (F) over the ground. The system 10 includes a fertilizer hopper 12 and a seed hopper 14 opening downwardly adjacent each other. The hoppers 12 and 14 terminate in lower fertilizer and seed openings 16 and 18, respectively, which as shown in FIG. 1 extend parallel to each other in the transverse direction. Rotatably mounted in the lower portion of the hoppers 12 and 14 are a pair of fertilizer and seed metering rolls 22 and 24, respectively, which are driven by a conventional ground wheel drive assembly (not shown) as the implement is moved forwardly over the field. The rolls 22 and 24 therefore meter fertilizer and seed through the respective fertilizer and seed openings 16 and 18 at a rate proportional to the ground speed of the implement. The metered fertilizer and seed are delivered to a chamber 28 and from there are propelled by air from a fan 32 into two separate conduits 36 and 38 to central fertilizer and seed distributors 42 and 44, respectively. From the distributors 42 and 44 the fertilizer and seed is delivered to separate fertilizer tubes 46 and seed tubes 48 for deposit into fertilizer and seed furrows formed by tools 52 and 54 on the implement. The chamber 28 includes a transversely extending central partition 58 which as shown in FIGS. 1 and 2 generally divide the chamber 28 into forward and rearward compartments 62 and 64, respectively. The fertilizer and seed hoppers 12 and 14 are separated by an upright partition 68 which, when the chamber 28 is attached to the hopper structure, is aligned with the central partition 58 (FIG. 2) to assure that fertilizer is metered into the rear compartment 62 and seed is metered into the forward compartment 64. A fertilizer baffle plate 72 extends downwardly toward the left side (as viewed rearwardly from the forward end of the implement in FIG. 1) of the compartment 62 to direct the fertilizer metered into the compartment toward the left side of the chamber 28. A seed baffle plate 74 extends downwardly and to the right in the rearward compartment 64 to direct seed toward the right side of the chamber 28. The central partition 58 opens at 82 and 84 (FIG. 3) to define respective venturi areas for receiving the fertilizer and the seed. The lower portions of the venturi areas 82 and 84 are separated by a generally V-shaped partition 88. Fertilizer is directed from the metering roll 22 onto the fertilizer baffle plate 72 and into the venturi area 82. Seed is metered by the seed roll 24 onto the seed baffle plate 74 and into the venturi area 84.

Air supply hoses 92 and 94 are connected to a main air supply conduit 96 which is connected to output 98 of the fan 32. The hoses 92 and 94 are connected to the front wall of the chamber 28 (FIGS. 1 and 2) and open into the venturi areas 82 and 84, respectively. Hose connectors 102 and 104 open into the rear wall of the chamber 28 and connect the respective venturi areas 82 and 84 with the fertilizer and seed conduits 36 and 38. The air from the hose 92 propels the fertilizer, directed by the fertilizer baffle plate 72 into the area 82, to the input end of the connector 102 and into the fertilizer conduit 36 for delivery to the fertilizer distributor 42 and tubes 46. Air from the air supply hose 94 is directed into the venturi area 84 to propel the seed into the hose connector 104 for delivery through the seed distributor 44 and tubes 48.

To provide a preselected amount of starter fertilizer into the seed venturi 84 to be mixed with the seed, an adjustable divider arrangement indicated generally at 110 is utilized to divide a portion of the stream of fertilizer from the fertilizer roll 22 away from the fertilizer venturi area 82. The divider arrangement 110 includes an upright transversely adjustable knife plate 112 supported above the seed venturi area 84 by an adjusting bolt assembly 114 or similar arrangement for maintaining the plate 112 in an upright position with the upper portion of the plate located closely adjacent the roll 22 and the lower portion of the plate 112 located over the venturi area 84. The upper end of the plate 112 terminates above the lower level of the feed roll 22 (FIG. 2) and angles downwardly and forwardly therefrom along an edge 116 toward the front wall of the chamber 28. The plate 112 extends downwardly into the front compartment 62. The baffle plates 72 and 74 are hinged at 122 to the V-shaped portion 88. The upper end of the baffle plate 72 rests against the side of the plate 112 (FIG. 3) and remains against the plate 112 as the plate is adjusted transversely by the assembly 114. As the roll 22 rotates to meter fertilizer into the compartment 62 and onto the baffle plate 72, a small preselected portion of the fertilizer which is metered to the right of the upright knife plate 112 (as viewed in FIG. 3) falls freely into the seed venturi area 84 to be mixed with the seed that is metered by the roll 24. The remaining portion of the metered fertilizer falls onto the baffle plate 72 and into the fertilizer airstream.

The total fertilizer application rate may be varied by moving the metering roll 22, which includes a non-fluted end 126, axially between sidewalls 128 and 130 of the fertilizer hopper 112. By moving the metering roll 22 to the right as viewed in FIG. 3, an increased portion of the non-fluted end 126 is exposed to the fertilizer in the hopper 12, and the overall amount of fertilizer metered is reduced. Movement of the metering roll 22 to the left increases the length of the fluted portion of the feed roll 22 contacting the fertilizer and thus increases the overall fertilizer rate. However, since the adjustable knife plate 112 is located adjacent the completely fluted end of the metering roll 22, adjustment of the overall metering rate of fertilizer does not effect the amount of the fertilizer which falls freely to the right-hand side (FIG. 3) of the plate 112 into the seed venturi area 84 to act as starter fertilizer.

Figure 3:
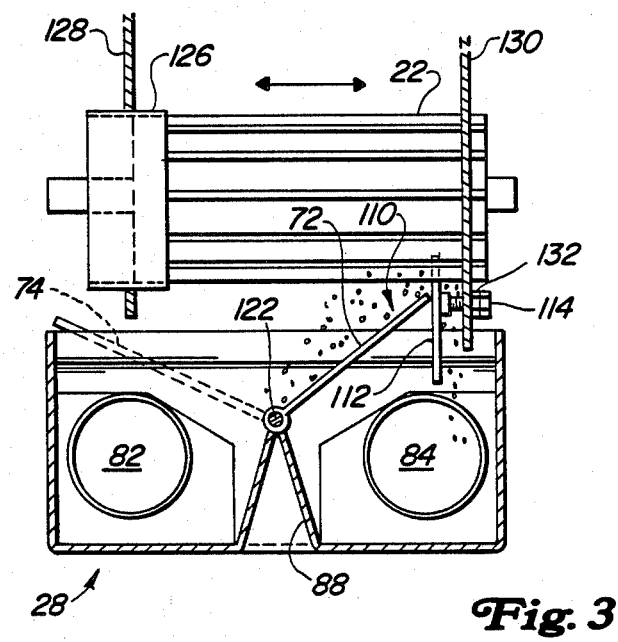
FIG. 3 is a front view of the metering structure of FIG. 2 showing the general configuration of the seed and fertilizer baffles and the adjustable knife plate in relation to the fertilizer feed roll.

As shown in FIG. 3, the adjustable bolt assembly 114 is mounted in the lower portion of the sidewall 130 below the feed roll 22. As the bolt is rotated with respect to an adjusting nut 132 the plate 112, which is mounted on the bolt, is moved transversely along the roll 22. As the plate 112 is adjusted transversely to vary the amount of starter fertilizer provided to the air seed stream, the overall fertilizer application rate remains unchanged. By moving the plate 112 to the wall 130, starter fertilizer can be completely cut off from the air seed stream.

Alternatively, the adjustable divider arrangement 110 can include structure for adjustably pivoting the baffle plate 72 without need for the upright knife plate 112. As the plate 72 is adjusted in the clockwise direction as viewed in FIG. 3, less fertilizer is delivered into the seed receiving area 84. Pivoting the baffle plate 72 in the counterclockwise direction will increase the amount of starter fertilizer provided to the area 84. However, it has been found that the knife plate 112 significantly improves the uniformity of the amount of starter fertilizer delivered to the seed venturi by reliably dividing the fertilizer immediately as it comes off of the metering roll 22. Although a venturi system is shown, the divider arrangement 110 of the present invention may also be utilized with other types of delivery systems.

Having described the preferred embodiment, it will be apparent that modifications can be made without departing from the scope of the invention as defined in the accompanying claims.

I claim;

1. In a metering system for a seeding implement including first and second hoppers and metering structure for metering first and second materials from the respective hoppers to a delivery system, material dividing structure including:
 a first area for receiving the first material metered from the first hopper;
 a second area for receiving second material metered from the second hopper;
 adjustable divider means for directing a preselected portion of the first material into the second area;
 a first delivery conduit;

means for conveying the first material from the first area to the first delivery conduit;
a second delivery conduit;
means for conveying the second material and the preselected portion of first material to the second delivery conduit; and
means for adjusting the rate of first material delivered to the first area without affecting the rate of delivery of the preselected portion of the first material to the second area.

2. The invention as set forth in claim 1 wherein the adjustable divider means is located adjacent the metering structure.

3. The invention as set forth in claim 1 wherein the adjustable divider means comprises an upright shiftable member and a movable baffle having a first end resting against the shiftable member and sloping downwardly toward the second area.

4. The invention as set forth in claim 3 including a partition located between the first and second areas and wherein the movable baffle includes a second end pivotally connected to the partition.

5. The invention as set forth in claim 1 wherein the first area comprises a fertilizer chamber and the second area comprises a seed chamber offset from the fertilizer chamber, said chambers being located adjacent the metering structure, and wherein the first and second delivery conduits comprise air distribution hoses for deliverying material in first and second air streams, respectively.

6. The invention as set forth in claim 1 wherein the means for adjusting the rate of first material comprises an axially movable fluted metering roll located above the divider means.

7. The invention as set forth in claim 6 wherein the divider means includes baffle means located above the seed chamber and having a downwardly sloped portion for directing the second stream away from the seed chamber and into the fertilizer chamber.

8. The invention as set forth in claim 7 wherein the divider means includes an adjustable upright plate located adjacent the upper end of the sloped portion.

9. The invention as set forth in claim 8 including means for maintaining the baffle means in contact with the upright plate.

10. In a metering system for a seeding implement including first and second hoppers and metering structure for metering first and second materials from the respective hoppers to a delivery system, material dividing structure including:
a first area for receiving the first material metered from the first hopper;
a second area for receiving second material metered from the second hopper;
adjustable divider means located adjacent the metering structure for directing a preselected portion of the first material into the second area, said divider means comprising an upright shiftable member and a movable baffle having a first end resting against the shiftable member and sloping downwardly toward the second area;
a first delivery conduit;
means for conveying the first material from the first area to the first delivery conduit;
a second delivery conduit; and
means for conveying the second material and the preselected portion of first material to the second delivery conduit.

11. The invention as set forth in claim 10 including means for adjusting the rate of first material delivered to the first area without affecting the rate of delivery of the preselected portion of the first material to the second area.

12. The invention as set forth in claim 10 including a partition located between the first and second areas and wherein the movable baffle includes a second end pivotally connected to the partition.

* * * * *